(12) United States Patent
Kawakami

(10) Patent No.: US 9,936,121 B2
(45) Date of Patent: Apr. 3, 2018

(54) IMAGE PROCESSING DEVICE, CONTROL METHOD OF AN IMAGE PROCESSING DEVICE, AND STORAGE MEDIUM THAT STORES A PROGRAM TO EXECUTE A CONTROL METHOD OF AN IMAGE PROCESSING DEVICE

(71) Applicant: CANON KABUSHIKI KAISHA, Tokyo (JP)

(72) Inventor: Takashi Kawakami, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/722,757

(22) Filed: May 27, 2015

(65) Prior Publication Data

US 2015/0358529 A1 Dec. 10, 2015

(30) Foreign Application Priority Data

Jun. 4, 2014 (JP) .................................. 2014-115773

(51) Int. Cl.
*H04N 5/232* (2006.01)
*G06T 5/50* (2006.01)
(Continued)

(52) U.S. Cl.
CPC ........... *H04N 5/23212* (2013.01); *G06T 5/50* (2013.01); *G06T 7/571* (2017.01);
(Continued)

(58) Field of Classification Search
CPC .. H04N 5/23212; H04N 5/23229; G06T 5/50; G06T 7/0069; G06T 2207/10052
See application file for complete search history.

(56) References Cited

U.S. PATENT DOCUMENTS 7,936,392 B2 * 5/2011 Ng ........................ G02B 3/0056
348/349
8,279,325 B2 * 10/2012 Pitts .................... H04N 5/23212
348/345
(Continued)

FOREIGN PATENT DOCUMENTS

CN 101742107 A 6/2010
CN 102638654 A 8/2012
(Continued)

OTHER PUBLICATIONS

Korean Office Action issued in Korean Patent Appln. No. 10-2015-0077050, mailed Feb. 16, 2017.
(Continued)

*Primary Examiner* — Daniel M Pasiewicz
(74) *Attorney, Agent, or Firm* — Fitzpatrick, Cella, Harper & Scinto

(57) ABSTRACT

A first image generating unit configured to generate a first image having a predetermined depth of field from each of a plurality of light-field data each of which a focus state is changeable; a searching unit configured to search the light-field data that includes a predetermined object by analyzing the first image generated by the first image generating unit; and a second image generating unit configured to generate a second image that has a shallower depth of field than the first image and focused on the predetermined object, based on the light-field data detected by the searching unit are included.

15 Claims, 15 Drawing Sheets

(51) Int. Cl.
*G06T 7/571* (2017.01)
*G02B 27/00* (2006.01)

(52) U.S. Cl.
CPC ..... *H04N 5/23229* (2013.01); *G02B 27/0075* (2013.01); *G06T 2207/10052* (2013.01)

(56) References Cited

U.S. PATENT DOCUMENTS

| | | | |
|---|---|---|---|
| 8,416,338 B2 | 4/2013 | Nagasaka et al. | |
| 8,559,705 B2* | 10/2013 | Ng | G06T 5/50 345/157 |
| 8,978,984 B2* | 3/2015 | Hennick | G06K 7/10732 235/462.41 |
| 8,995,785 B2* | 3/2015 | Knight | H04N 5/23293 382/275 |
| 9,082,013 B2 | 7/2015 | Yadani et al. | |
| 9,380,281 B2* | 6/2016 | Kagaya | H04N 9/87 |
| 9,456,118 B2 | 7/2016 | Nagano et al. | |
| 2007/0230944 A1* | 10/2007 | Georgiev | H04N 5/2254 396/322 |
| 2012/0194709 A1* | 8/2012 | Yokohata | H04N 5/23212 348/240.3 |
| 2012/0249550 A1* | 10/2012 | Akeley | H04N 5/232 345/419 |
| 2013/0342526 A1* | 12/2013 | Ng | G06T 15/205 345/419 |
| 2014/0240463 A1* | 8/2014 | Pitts | H04N 5/23212 348/46 |
| 2014/0267243 A1* | 9/2014 | Venkataraman | G06T 7/0065 345/419 |
| 2015/0103192 A1* | 4/2015 | Venkatraman | H04N 5/23212 348/208.5 |

FOREIGN PATENT DOCUMENTS

| | | |
|---|---|---|
| CN | 102957863 A | 3/2013 |
| CN | 103034987 A | 4/2013 |
| CN | 103348381 A | 10/2013 |
| JP | 2009-081810 A | 4/2009 |
| JP | 2010-086194 A | 4/2010 |
| JP | 2013-125050 A | 6/2013 |
| JP | 2014103601 A * | 6/2014 |

OTHER PUBLICATIONS

Office Action dated Dec. 5, 2017, issued in corresponding Chinese Patent Application No. 201510293820.9.

* cited by examiner

IMAGE PROCESSING DEVICE, CONTROL METHOD OF AN IMAGE PROCESSING DEVICE, AND STORAGE MEDIUM THAT STORES A PROGRAM TO EXECUTE A CONTROL METHOD OF AN IMAGE PROCESSING DEVICE

BACKGROUND OF THE INVENTION

Field of the Invention

The present invention relates to an image processing device that searches for an object from a shot image and generates an image focusing on an object image that is a search result, and its control method.

Description of the Related Art

An imaging apparatus referred to as a light-field (hereinafter referred to as "LF") camera has been commercialized in recent years. This imaging apparatus enables shooting light in a plurality of directions and obtaining information of light rays by splitting incident light through a microlens array arranged on an image sensor. Hereinafter, an image shot by the LF camera is referred to as "LF image" and image data is referred to as "LF data". It is possible to reconstruct an image at an optional viewpoint and an image focusing at an optional position and with an optional depth of field by executing predetermined calculation processing after shooting based on the intensity of the light rays relating to the LF data and its incident direction. That is, a feature in which the image for which the viewpoint, the focus position, and the depth of field can be reconstructed after shooting by performing the arithmetic processing on the recorded data is an advantage of the LF camera. This reconstruction processing is referred to as development processing of the LF image.

It is common that the development processing is performed by focusing on a predetermined default focus position when the LF image is displayed. For example, setting information during the display of the LF image at the previous time is stored as the default focus position and the setting information is used next time. Additionally, an image search (object search) in which an object, including a person, is specified as search criteria and an image of the specified object is searched for by using object recognition and meta data is commonly performed. Japanese Patent Application Publication No. 2010-086194 discloses a presentation method of image search results.

As described above, the focus position and the like during the display of the LF image at the previous time is set as the default, the development is performed by focusing on the position and the LF image is displayed, but the object may not always be focused in such a setting. FIG. 16A illustrates an example of the LF image. This illustrates a state of focusing on an object 122 among three objects 121, 122 and 123 as a default state. Accordingly, the object specified as the search target (for example, the object 123) may not always be focused on even performing the development by focusing on the default focus position. Therefore, a user may need to search for the object to be searched for while adjusting the focus position again. For example, the user may need to perform an adjustment operation for focusing on the object 123 that is the search target, as shown in the example of the LF image in FIG. 16B, and thus the operation is complicated.

Additionally, the prior art in Japanese Patent Application Publication No. 2010-086194 discloses changing a shape or color of a frame line that emphasizes the object to be searched for, but the focus position of the image to be displayed is not considered.

SUMMARY OF THE INVENTION

The present invention increases the convenience for a user by focusing on an object to be searched for, in an image processing device that processes light-field data.

A device according to the present invention comprises a first image generating unit configured to generate a first image having a predetermined depth of field from each of a plurality of light-field data each of which a focus state is changeable; a searching unit configured to search the light-field data that includes a predetermined object by analyzing the first image generated by the first image generating unit; and a second image generating unit configured to generate a second image that has a shallower depth of field than the first image and focused on the predetermined object, based on the light-field data detected by the searching unit.

According to the present invention, focusing on the object to be searched enables increasing the convenience for the user.

Further features of the present invention will become apparent from the following description of exemplary embodiments (with reference to the attached drawings).

DESCRIPTION OF THE EMBODIMENTS

Hereinafter, a detailed description will be given of each embodiment of the present invention with reference to attached drawings. A description will be given of an LF camera before describing an image processing device according to embodiments of the present invention.

Figure 1A:
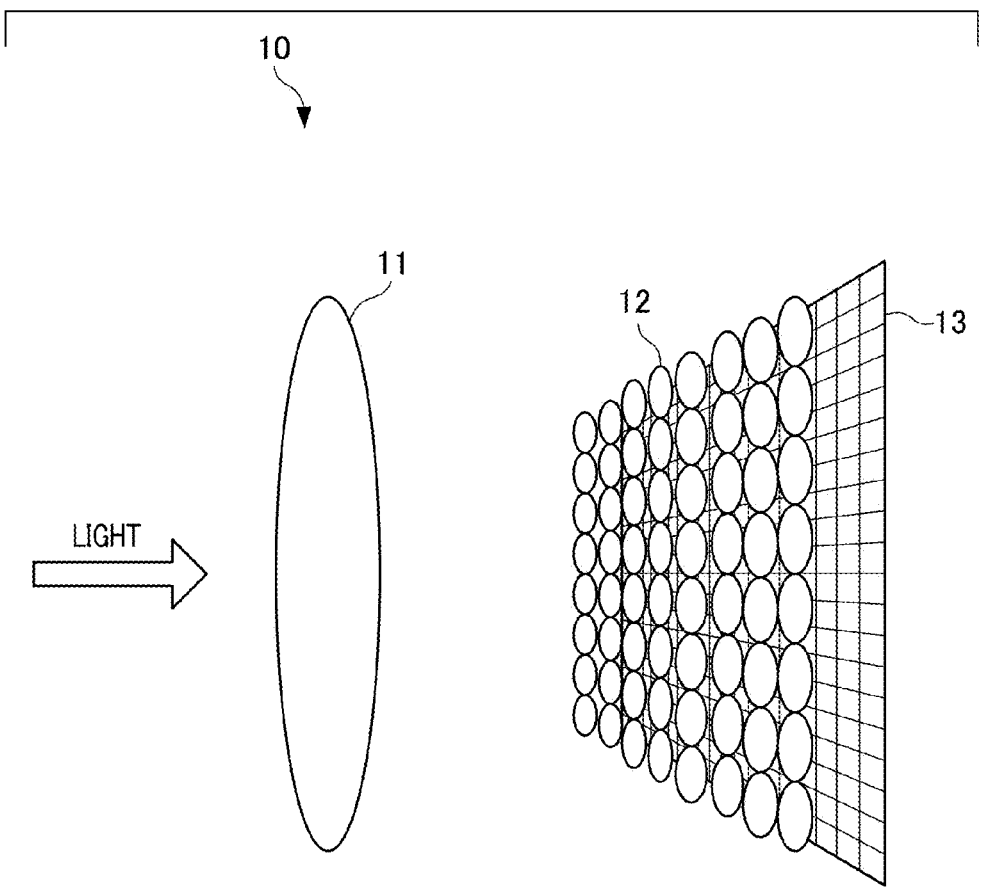
FIGS. 1A and 1B are schematic diagrams illustrating configuration examples A and B inside an LF camera.
Figure 1B:
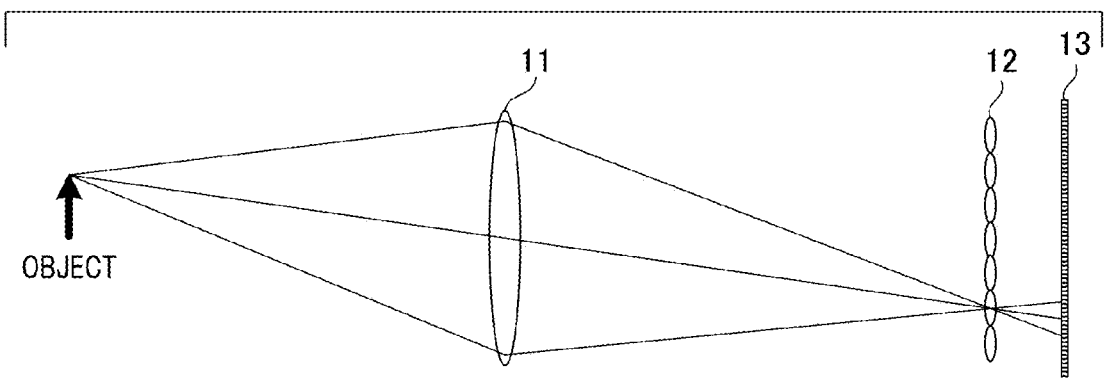

FIG. 1 exemplifies a schematic configuration of the LF camera. Light that is incident from an object to a microlens array 12 through an imaging lens 11 configuring an imaging optical system is photoelectrically converted by an image sensor 13, and an electric signal is obtained. Note that imaging data obtained here is LF data.

An imaging lens 11 projects the light from the object to the microlens array 12. The imaging lens 11 is interchangeable and it is used by being mounted on a main body of an imaging apparatus 10. A user can change the imaging magnification by a zoom operation of the imaging lens 11. The microlens array 12 is configured by arranging microlenses in a grid shape and being positioned between the imaging lens 11 and the image sensor 13. Each of the microlenses configuring the microlens array 12 splits the incident light from the imaging lens 11 and outputs the split light to the image sensor 13. The image sensor 13 configuring an imaging unit is an imaging element having a plurality of pixels and detects light intensity at each of the pixels. The light split through each of the microlenses is incident to each of the pixels in the image sensor 13 that receives the light from the object.

Figure 2:
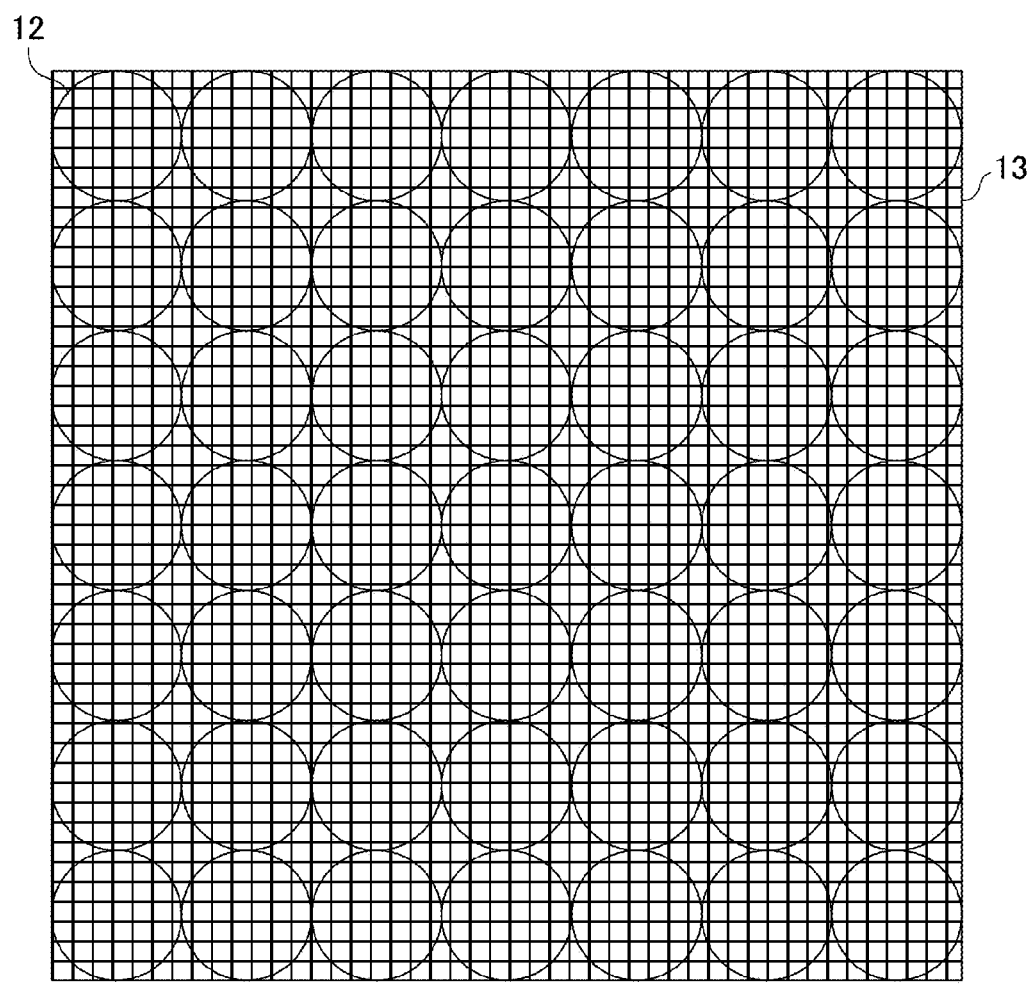
FIG. 2 is a schematic diagram illustrating a positional relation between microlens array 12 and each pixel in an image sensor 13.

FIG. 2 is a schematic diagram illustrating a positional relation between the microlens array 12 and each pixel in the image sensor 13. Each of the microlenses of the microlens array 12 is arranged so that the plurality of pixels in the image sensor 13 corresponds. The light that is split by each of the microlenses is incident to each of the pixels in the image sensor 13 and the light intensity (information of light rays) from different directions can be detected at each of the pixels. Additionally, it is possible to know the incident directions (information of direction) of light rays that are incident to each of the pixels in the image sensor 13 through the microlens according to the positional relation between each of the microlenses and each of the pixels in the image sensor 13. Specifically, information about a travelling direction of the light is detected in accordance with a distribution of the light intensity. An image on a focal plane having different distances from a lens apex plane of the microlens array 12 can be obtained by synthesizing each output of the pixels in the image sensor 13 positioned corresponding to eccentricity from an optical axis of each of the microlenses. Note that the light rays are represented by a function parameterized by two parallel planes by using a parameter, for example, a position, a direction, and a wavelength. Specifically, the incident direction of the light to each of the pixels is determined according to the arrangement of the plurality of pixels corresponding to each of the microlenses. As described above, the imaging apparatus 10 obtains the information about light rays and the information about directions and performs the sorting of light rays and calculation processing (hereinafter referred to as "reconstruction"), so that the image data at an optional focus position and an optional viewpoint can be generated. This information about the light rays and the information about the direction are included in the LF data. The focus position in this case allows the user to focus on a desired image area after shooting.

Figure 3:
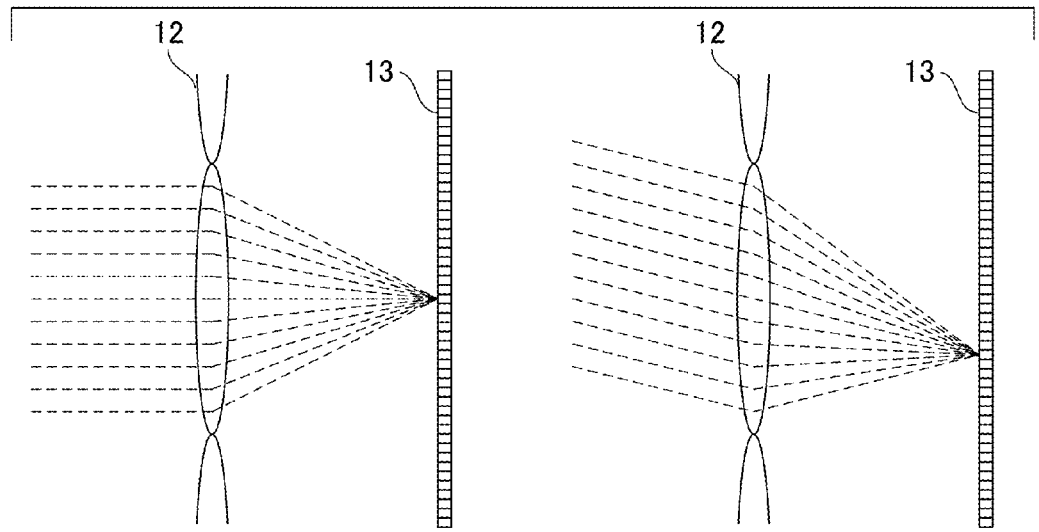
FIG. 3 is a schematic diagram illustrating a relation between a travelling direction of incident light rays to microlenses and a recording area in the image sensor 13.

FIG. 3 is a schematic diagram illustrating a relation between the travelling direction of the incident light rays to the microlenses of the microlens array 12 and the recording area in the image sensor 13. The object image through the imaging lens 11 is formed on the microlens array 12 and the incident light rays to the microlens array 12 are received at the image sensor 13 through the microlens array 12. At this time, as shown in FIG. 3, the light rays that are incident to the microlens array 12 are received at different positions on the image sensor 13 according to their travelling directions, and the object image that becomes a similar figure with respect to the shape of the imaging lens 11 is formed for each of the microlenses.

Figure 4:
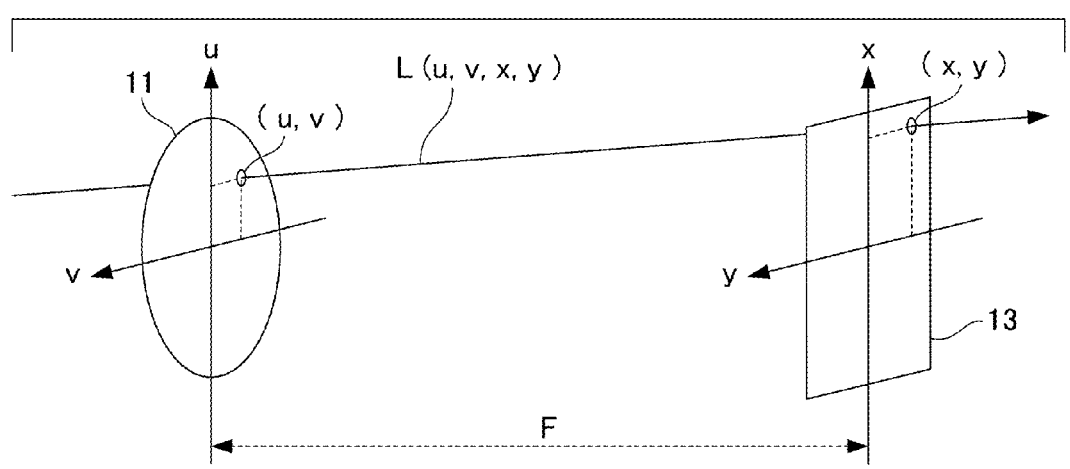
FIG. 4 is a schematic diagram illustrating information of light rays that are incident to the image sensor 13.

FIG. 4 is a schematic diagram illustrating the information of light rays that are incident to the image sensor 13. A description will be given of the light rays received at the image sensor 13 by using FIG. 4. Here, a rectangular coordinate system on the lens surface of the imaging lens 11 is denoted as (u and v) and a rectangular coordinates system on an imaging plane of the image sensor 13 is denoted as (x and y). Further, a distance between the lens surface of the imaging lens 11 and the imaging plane of the image sensor 13 is denoted as "F". Thus, the intensity of light passing through the imaging lens 11 and the image sensor 13 can be represented by a four dimensional function L (u, v, x and y) shown in the drawing. Because the light rays that are incident to each of the microlenses are incident to different pixels depending on the travelling direction, in addition to the position information of the light rays, the four dimensional function L (u, v, x and y) holding the traveling direction of the light rays is recorded in the image sensor 13.

Figure 5:
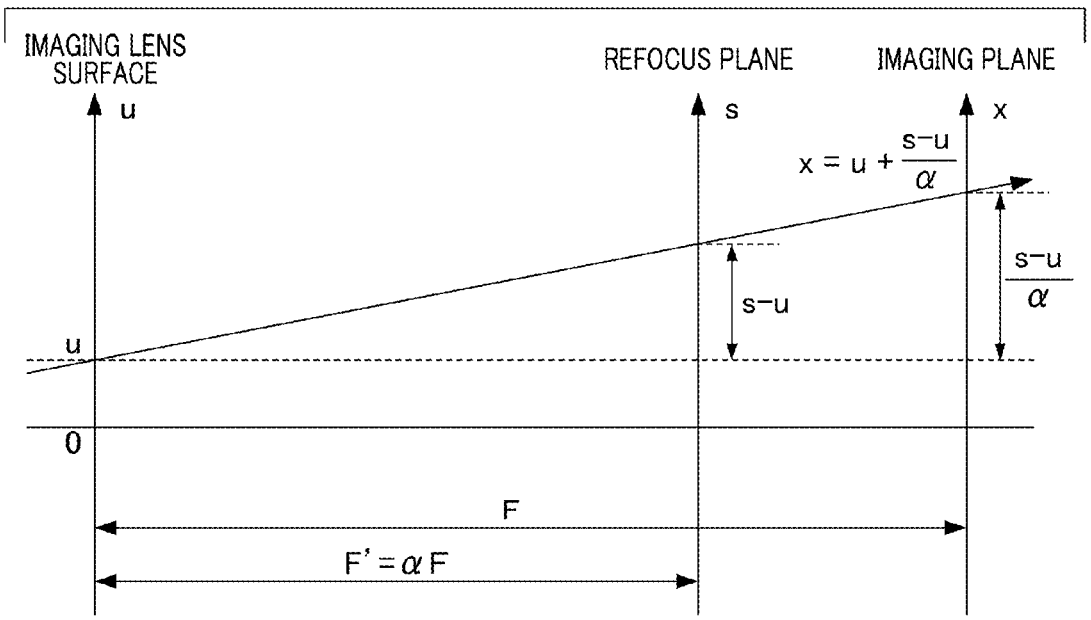
FIG. 5 is a schematic diagram illustrating refocuses arithmetic processing.

Next, a description will be given of refocus arithmetic processing after imaging. FIG. 5 is a schematic diagram illustrating the refocus arithmetic processing. As shown in FIG. 5, when the positional relation among the imaging lens surface, the imaging plane, and a refocus plane is set, the intensity of light rays L' (u, v, s and t) in the rectangular coordinates system (s and t) on the refocus plane is represented as the formula (1) below.

[Formula 1]

$$L'(u, v, s, t) = L\left(u, v, u + \frac{s-u}{\alpha}, v + \frac{t-v}{\alpha}\right) \quad (1)$$

Additionally, an image E' (s and t) obtained on the refocus plane is obtained by integrating the intensity of light rays L' (u, v, s and t) with respect to a lens aperture, and thus, it is represented as the formula (2) below.

[Formula 2]

$$E'(s, t) = \frac{1}{\alpha^2 F^2} \int\int L\left(u, v, u + \frac{s-u}{\alpha}, v + \frac{t-v}{\alpha}\right) du dv \quad (2)$$

Accordingly, an image set to an optional focal point (refocus plane) can be reconstructed by performing the refocus arithmetic processing by this formula (2).

Next, a description will be given of adjustment processing of a depth of field after shooting. Weighting is performed by multiplying a weighting coefficient per image data that forms an image area assigned to each of the microlenses before the refocus arithmetic processing. For example, when generating an image having a deep depth of field is desired, integration processing is performed by using only the information about light rays that are incident to a receiving plane of the image sensor 13 at relatively small angles. In other words, the light rays that are incident to the image sensor 13 at relatively large angles are not included in the integration processing by multiplying a weighting coefficient of 0 (zero).

Figure 6:
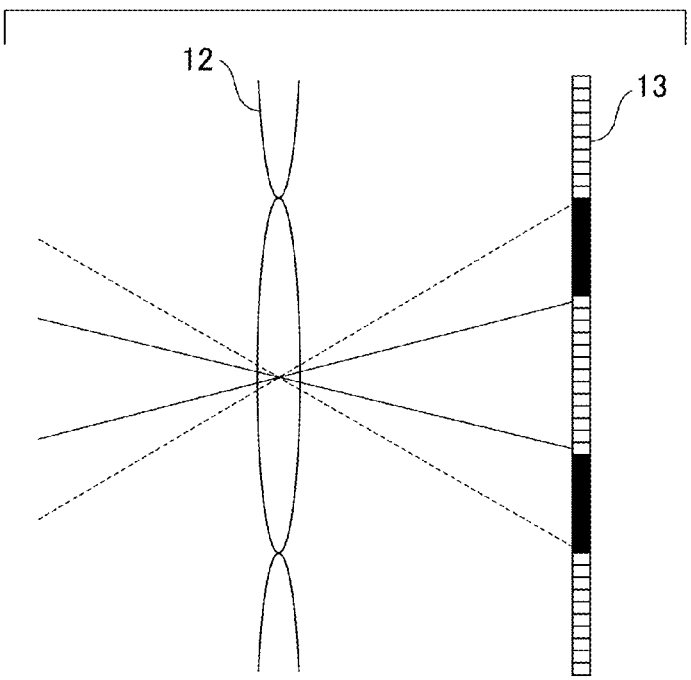
FIG. 6 is a schematic diagram illustrating a relation between differences in incident angles to the microlenses and the recording area in the image sensor 13.
Figure 7:
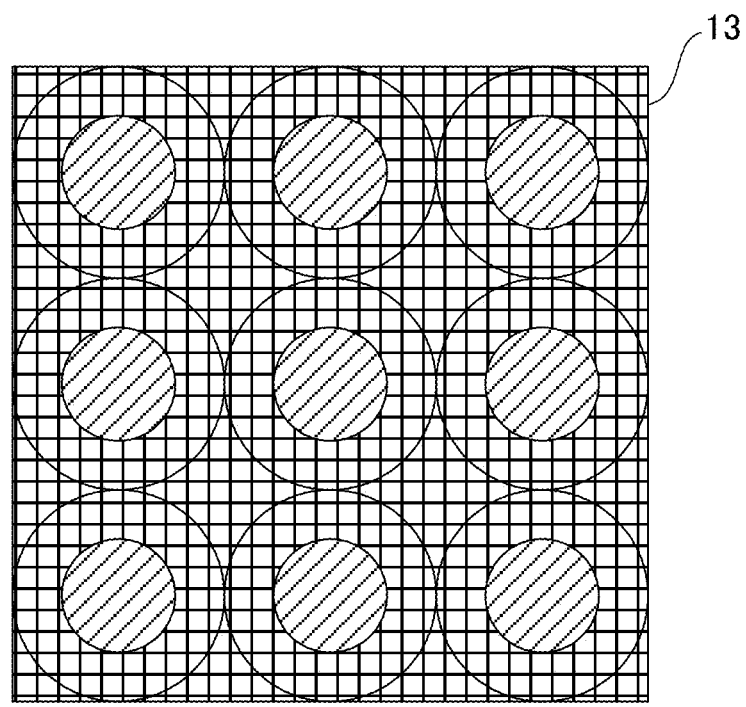
FIG. 7 is a schematic diagram illustrating the adjustment processing for the depth of field.

FIG. 6 is a schematic diagram illustrating a relation between the differences in the incident angle to the microlenses and the recording area in the image sensor 13, and FIG. 7 is a schematic diagram illustrating the adjustment processing for the depth of field. As shown in FIG. 6, the light rays that are incident to the image sensor 13 at relatively small angles are positioned at a more central area. Accordingly, as shown in FIG. 7, the integration processing is performed by using only the pixel data obtained in a center portion in the area (hatched areas in the drawing). Through such processing, it is possible to express an image having a deep depth of field as if an opening diaphragm included in a typical imaging apparatus is narrowed. It is also possible to generate a pan-focus image having a deeper depth of field by reducing pixel data in the center portion to be used. As described above, the depth of field of the image can be adjusted after shooting based on the LF data (information of light rays) actually obtained.

First Embodiment

Figure 8:
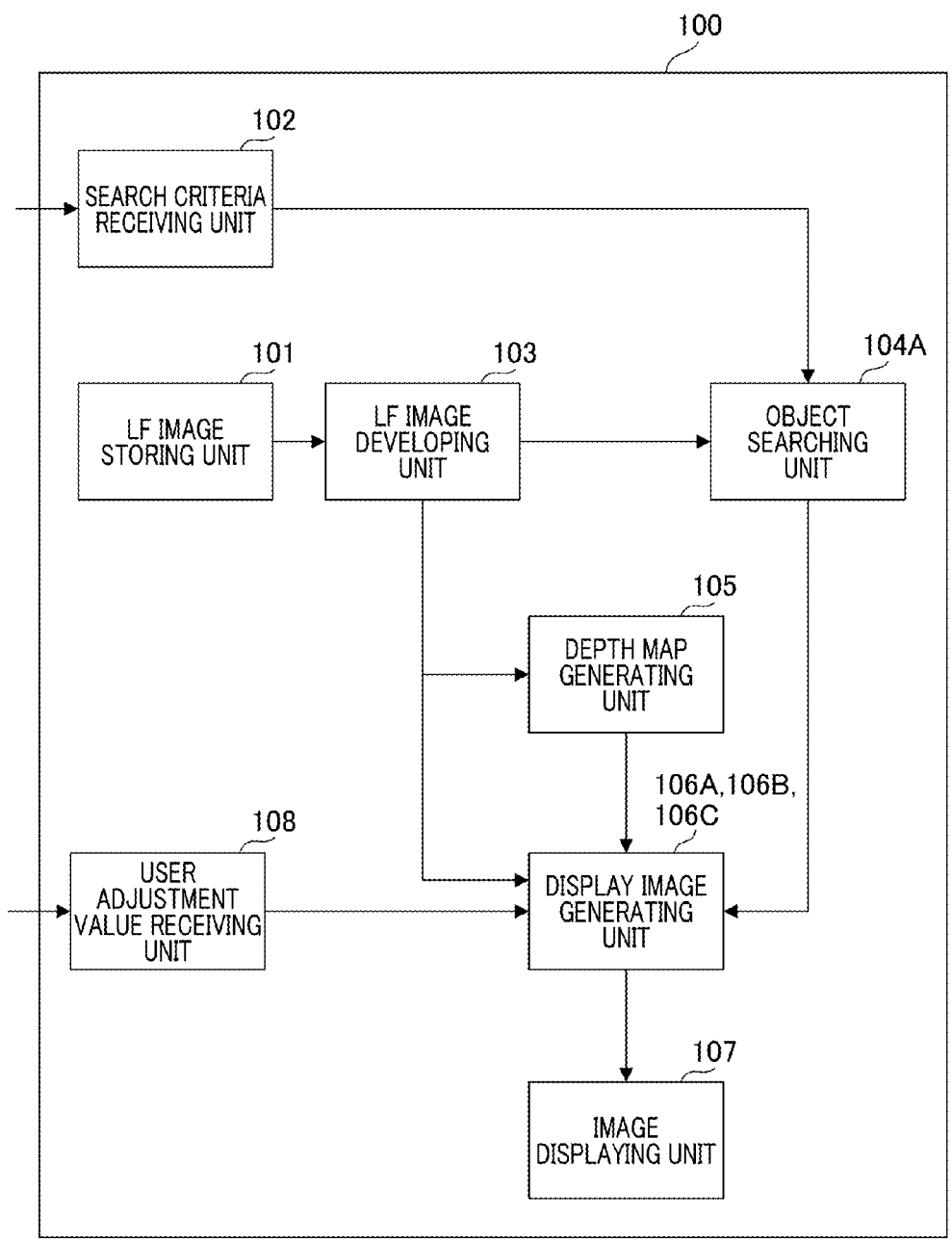
FIG. 8 is a block diagram illustrating a schema of an image display device according to an embodiment of the present invention.

FIG. 8 is a block diagram schematically illustrating a configuration example of an image display device 100 according to the embodiment of the present invention. An LF image storing unit 101 receives the data of the LF image shot by the LF camera and stores it in a memory. Additionally, the LF image storing unit 101 transmits the stored LF data according to a request from an LF image developing unit 103. The LF data may be directly received from the LF camera connected with the image display device through a USB (Universal Serial Bus) and the like, or it the LF data may be stored in a storing media, for example, a SD card is read.

A search criteria receiving unit 102 receives search criteria of the object that is specified by the user through the operation unit and transmits it to an object searching unit 104. There is a method for specifying the search criteria that is performed by inputting the image to be searched for. Alternatively, there is a method for specifying the search criteria performed by selection through the user's operation among the images registered beforehand.

The LF image developing unit 103 reads out the LF data from the LF image storing unit 101 and performs the predetermined arithmetic processing. The predetermined arithmetic processing is necessary processing for developing the LF image, and the processing is performed according to the requests from the object searching unit 104, a depth map generating unit 105, and a display image generating unit 106.

The object searching unit 104 searches for the image that matches the search criteria of the object received from the search criteria receiving unit 102, from among all of the images stored in the LF image storing unit 101. The details about the object searching unit 104 will be described below. The depth map generating unit 105 executes distance information generating processing according to the request from the display image generating unit 106. A depth map is created by the generation of the distance information in each of the pixels in the LF image. The distance information corresponding to the depth in the image is calculated by generating the images having two and more different viewpoints, and by detecting a positional displacement of the plurality of generated images. The display image generating unit 106 generates display image data. The details about the display image generating unit 106 will be described below. An image displaying unit 107 displays the image on a screen according to the image data generated by the display image generating unit 106.

A user adjustment value receiving unit 108 receives information about the focus position specified by the user through the operation unit (specified coordinates information) and transmits it to the display image generating unit 106. The focus position corresponds to a (focus) position on which to focus in the shot LF image. As for the specification of the focus position, there is a method in which the user specifies the position of the object to be focused by utilizing a pointing device, a touch panel, or the like. Alternatively, there is a method in which the user specifies the focus position by utilizing a sliding bar (scroll bar) or the like.

Figure 9:
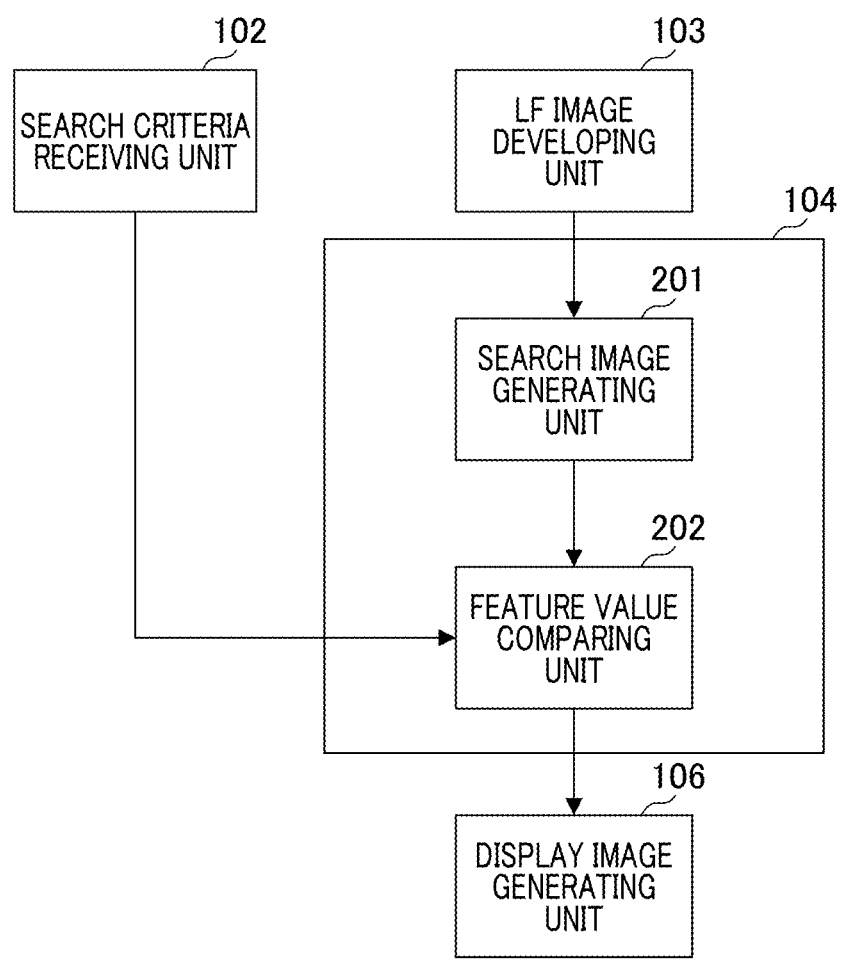
FIG. 9 is a block diagram illustrating a schema of a object searching unit of FIG. 8.

Next, details of the object searching unit 104 will be described. FIG. 9 is a block diagram of a schema of a configuration mainly illustrating the object searching unit 104. The object searching unit 104 includes a search image generating unit 201 and a feature value comparing unit 202.

Figure 16A:
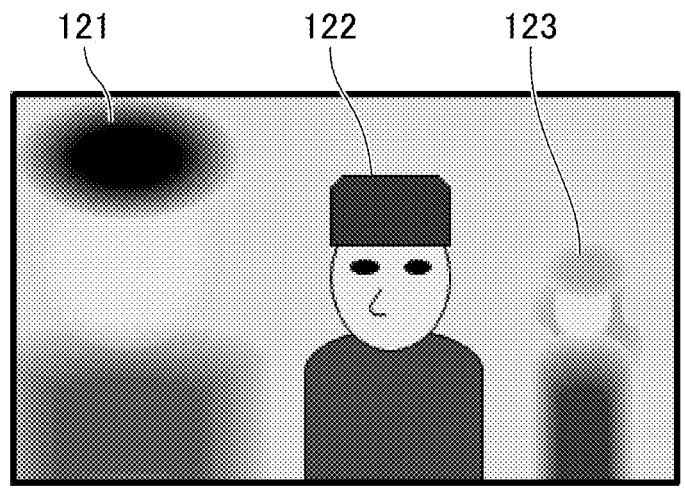
FIGS. 16A and 16B are diagrams illustrating examples of an LF image.
Figure 17A:
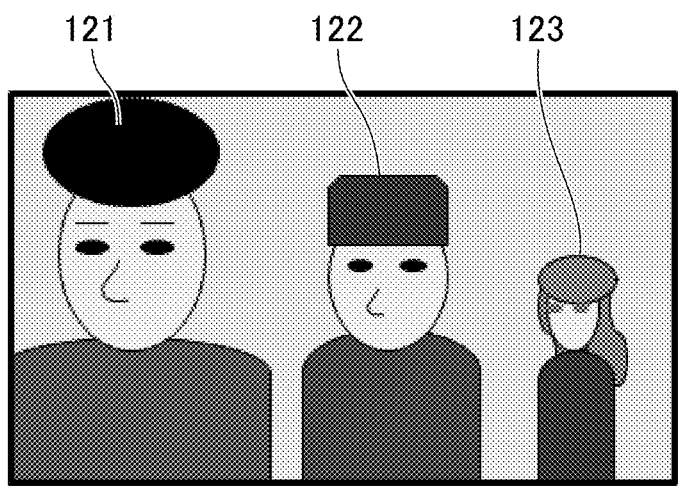
FIGS. 17A and 17B are diagrams illustrating examples of pan-focus images and examples of notification processing to a user.

The search image generating unit 201 requests developing the LF data obtained from the LF image storing unit 101 of the LF image developing unit 103. While the focus position in the LF image is changeable during the development, the object in an unfocused location (blurred object) cannot be detected when the object search is performed by using the image that was developed by focusing on a specific position. For example, it is difficult to detect the objects 121 and 123 in a state shown in FIG. 16A. Accordingly, the search image generating unit 201 requests generating an image having a maximum depth of field and focusing on all of the objects in the image (pan-focus image) of the LF image developing unit 103. The LF image developing unit 103 generates pan-focus image data as image data for searching for the object. FIG. 17A illustrates an example of the pan-focus image that focuses on all of the objects 121, 122 and 123. A feature value comparing unit 202 analyzes the image received from the search criteria receiving unit 102 and the search image generating unit 201, and detects the object. The feature value comparing unit 202 calculates feature values of the detected object and compares them. The image data processed by the feature value comparing unit 202 is image data that has been developed by the LF image developing unit 103. Hence, in the extraction of the object image and the calculation of the feature values, the known method for a JPEG (Joint Photographic Experts Group) image and the like can be used.

Figure 10:
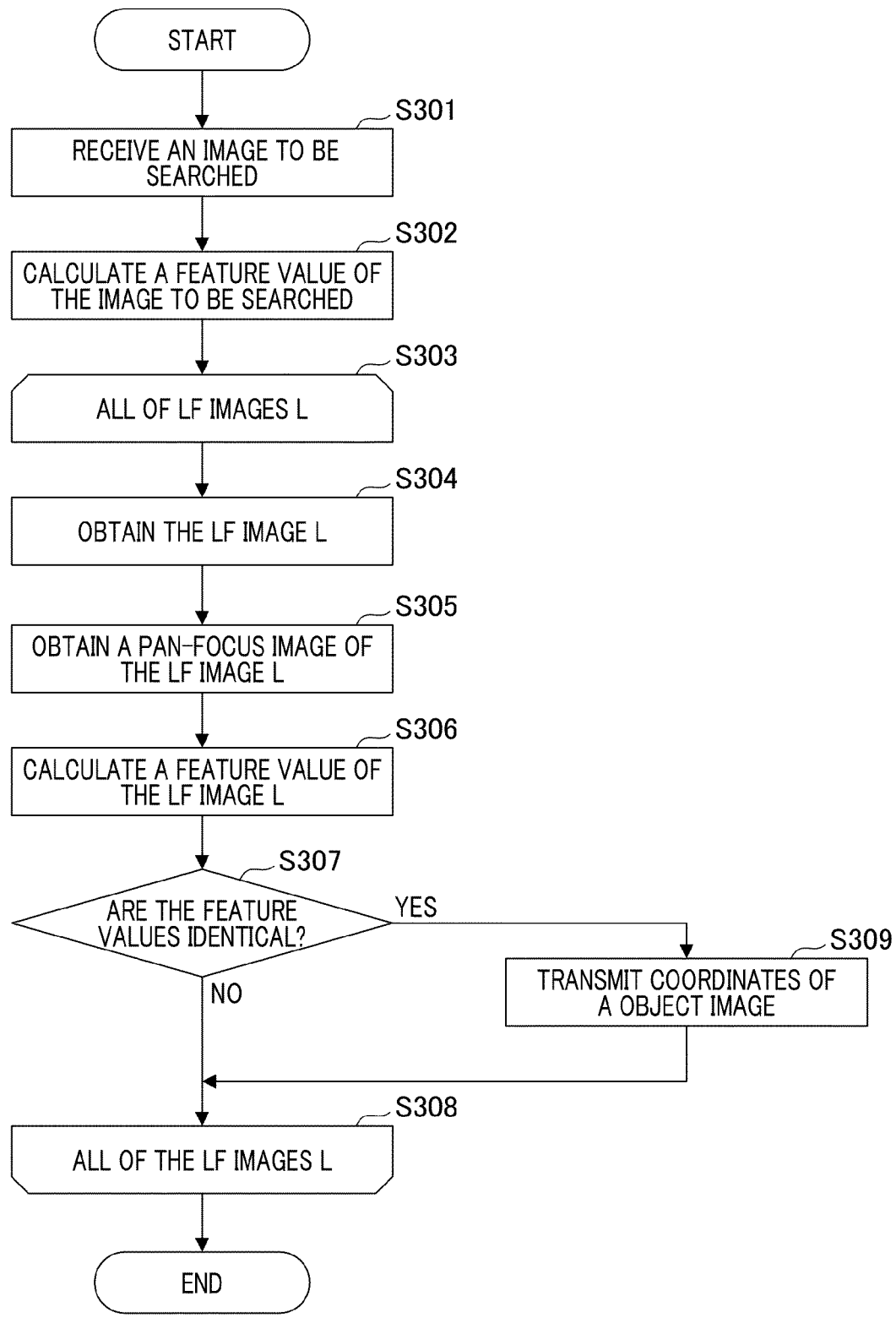
FIG. 10 is a flowchart illustrating an example of a process of the object searching unit in FIG. 8.

FIG. 10 is a flowchart illustrating an example of a process performed by the object searching unit 104. The process below is achieved by reading out and executing a program from a memory by a CPU (Central Processing Unit) configuring a control unit of the image processing device.

The object searching unit 104 first receives the image data to specify the search criteria from the search criteria receiving unit 102 (S301). Next, the object searching unit 104 calculates the feature value of the object image from the received image data (S302). Iterating processing is performed in steps from S304 to S307, which are between steps S303 and S308, and a step S309. The object searching unit 104 subsequently obtains the LF images from the LF image storing unit 101 (S304) and requests the development of the pan-focus images of the LF image developing unit 103 (S305). The object searching unit 104 obtains the pan-focus images developed by the LF image developing unit 103, detects the object image of the image, and calculates the feature value (S306). The object searching unit 104 determines whether or not the feature value calculated in S306 is identical with the feature value of the object specified as the search criteria (S307). When these feature values are identical, the process proceeds to S309 and when these feature values are not identical, the process proceeds to S303 from S308 to continue the process. In S309, the object searching unit 104 notifies a file identifier of the corresponding LF image, for which it has been determined that the feature values of the object are identical, and the coordinates information of the corresponding object image of the display image generating unit 106. Then, the process proceeds to S303 from S308 and continues until the process for all of the LF images ends.

Figure 11:
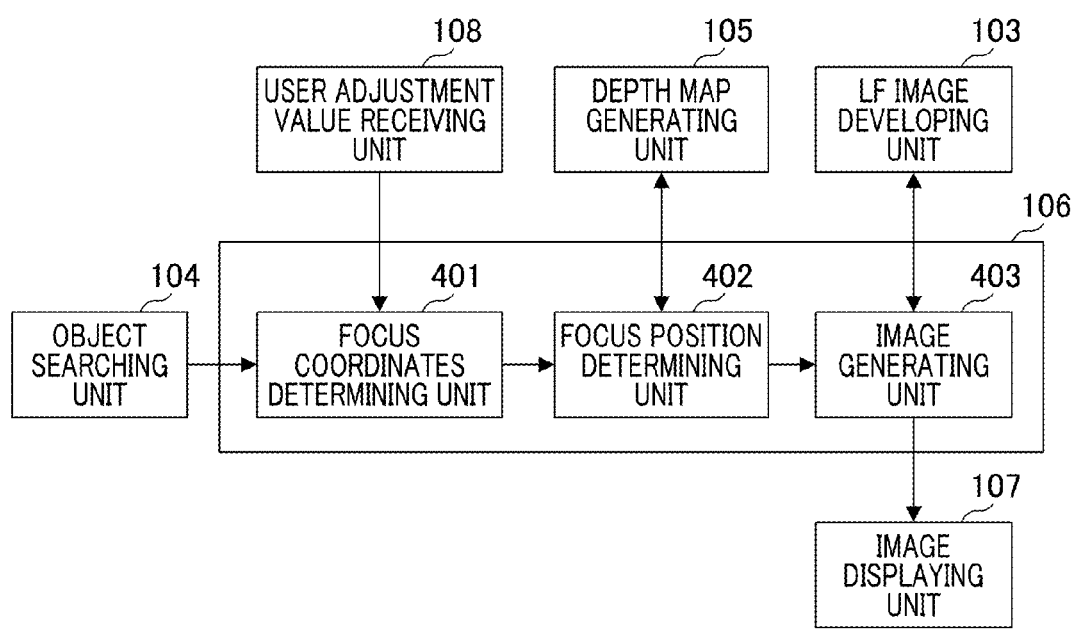
FIG. 11 is a block diagram illustrating a schema of a display image generating unit in FIG. 8.

Next, a detailed description will be given of the display image generating unit 106. FIG. 11 is a block diagram mainly illustrating a schematic example of a configuration of the display image generating unit 106. The display image generating unit 106 includes a focus coordinates determining unit 401, a focus position determining unit 402, and an image generating unit 403. The focus coordinates determining unit 401 performs coordinates information selecting processing with respect to the coordinates information from the object searching unit 104 and the user adjustment value receiving unit 108. The focus coordinates determining unit 401 receives the coordinates information of the image on which the object to be in focus is shot (object image) from the object searching unit 104 or the user adjustment value receiving unit 108 and transmits either of them to the focus position determining unit 402. The coordinates information transmitted from the focus coordinates determining unit 401 is determined according to whether or not the image to be displayed is a result for the object search. That is, when the image to be displayed is the result of the object search, the focus coordinates determining unit 401 transmits the coordinates information received from the object searching unit 104 to the focus position determining unit 402. When the image to be displayed is not the result for the object search, the coordinates information received from the user adjustment value receiving unit 108 is transmitted to the focus position determining unit 402.

The focus position determining unit 402 transmits the coordinates information received from the focus coordinates determining unit 401 to the depth map generating unit 105. The depth map generating unit 105 returns the distance information corresponding to the received coordinates information based on the depth map created through the distance information generating processing. The focus position determining unit 402 obtains the distance information corresponding to the coordinates information from the depth map generating unit 105 and transmits it to the image generating unit 403. The image generating unit 403 transmits the distance information received from the focus position determining unit 402 to the LF image developing unit 103, which serves as the information for the focus position used during the development, and requests the development of the LF image. The image generating unit 403 transmits the image data developed by the LF image developing unit 103 to the image displaying unit 107. Hence, the image focusing on the desired object is displayed on the screen of the image displaying unit 107.

Figure 12:
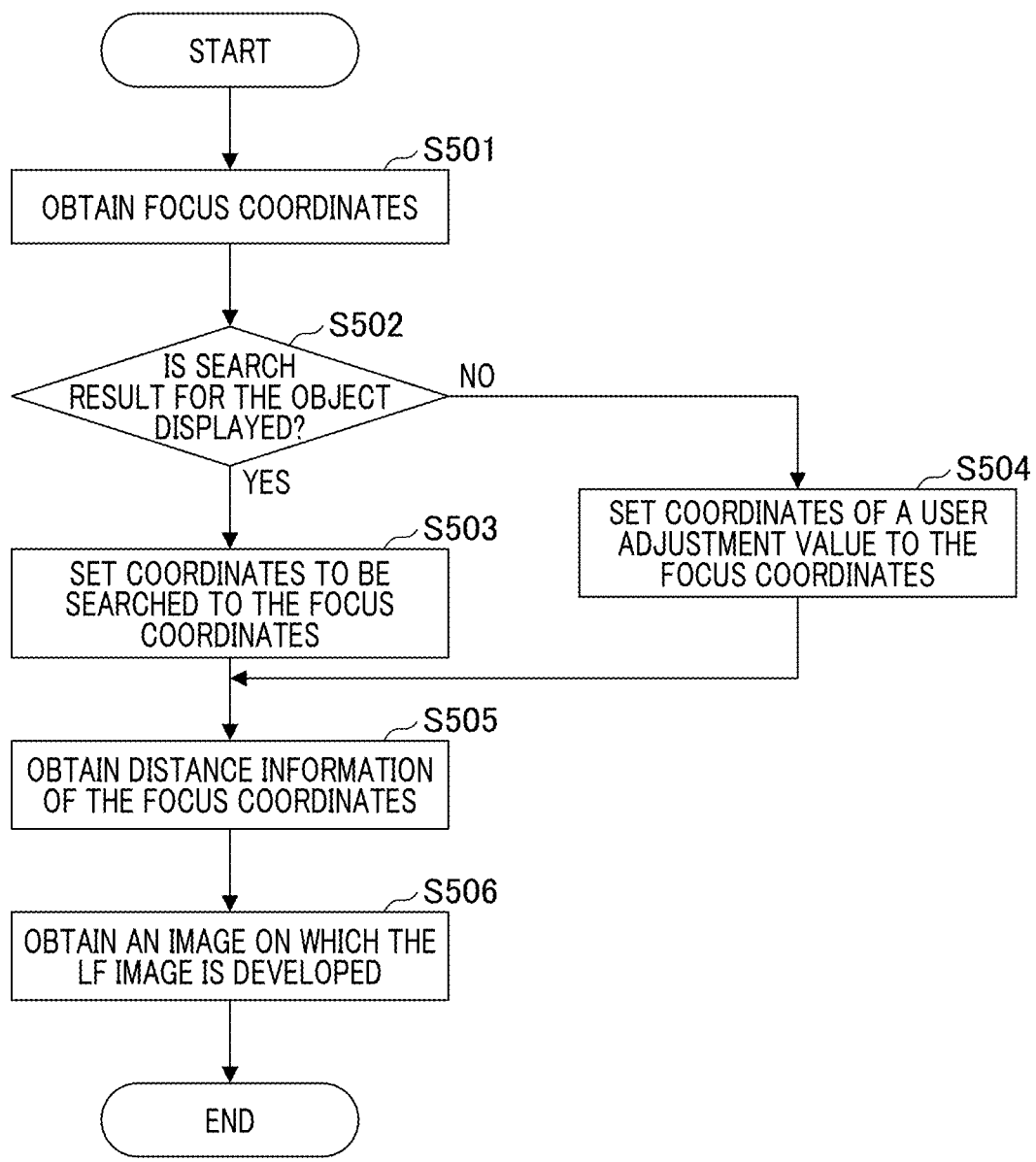
FIG. 12 is a flowchart illustrating an example of a process of the display image generating unit in FIG. 8.

FIG. 12 is a flowchart illustrating an example of a process performed by the display image generating unit 106. The focus coordinates determining unit 401 obtains the coordinates information to be focused on (focus coordinates) from the user adjustment value receiving unit 108 and the object searching unit 104 (S501). Next, the focus coordinates determining unit 401 determines whether or not the current display mode is a display mode of the object search results (S502). The process proceeds to S503 when it is the display mode of the object search results, or the process proceeds to S504 when it is not the display mode of the object search results.

Figure 16B:
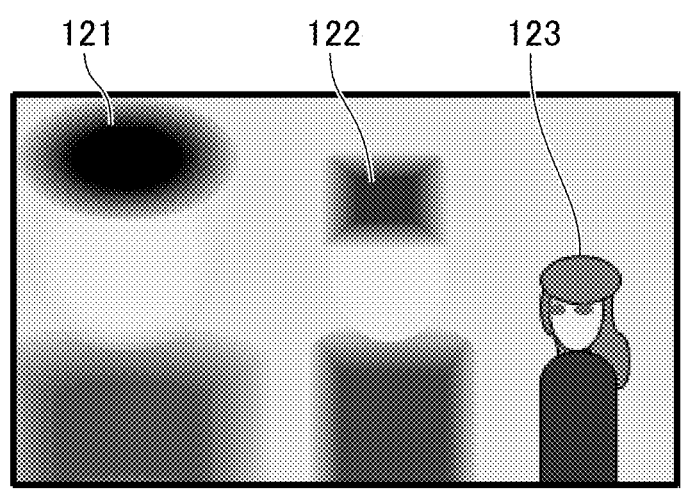

In S503, the focus coordinates determining unit 401 sets the coordinates to be searched indicated by the information received from the object searching unit 104 to the focus coordinates. Additionally, in S504, the focus coordinates determining unit 401 sets the coordinates indicated by the information received from the user adjustment value receiving unit 108 to the focus coordinates. The process proceeds to S505 subsequent to S503 or S504, and the focus position determining unit 402 transmits the coordinates information received from the focus coordinates determining unit 401 to the depth map generating unit 105. That is, after the focus coordinates set in S503 or S504 are transmitted to the depth map generating unit 105, the focus position determining unit 402 obtains the distance information corresponding to the focus coordinates and transmits it to the image generating unit 403. The image generating unit 403 transmits the distance information obtained in S505 to the LF image developing unit 103 (S506). The LF image developing unit 103 develops the image focusing on the coordinates set in S503 or S504 and the image generating unit 403 obtains the image data after the development and transmits it to the image displaying unit 107. Accordingly, for example, as shown in FIG. 16B, the image focusing on the object 123, which is the search result, is displayed on the screen of the image displaying unit 107.

In the present embodiment, when the LF image is displayed as the result for the object search, the image focusing on the object to be searched for is displayed as the search result. Therefore, the adjustment of the focus position by a user's manual operation is no longer needed during the object search. That is, the convenience of the user increases by displaying the LF image focusing on the object to be searched.

Second Embodiment

Next, a description will be given of a second embodiment of the present invention. In the present embodiment, when a plurality of objects is detected as a result for the object search, processing in which all of the detected objects are focused on and displayed is executed. For example, when a plurality of criteria for the object search is specified and when the LF image on which a plurality of persons who resemble each other like a sibling is detected as a result for the object search, the image is displayed in a state of focusing on all of the detected objects. Note that detailed explanations are omitted by using reference numerals already used for the structural elements that are identical to the case of the first embodiment, and the points of difference will be explained in detail. Such a manner of omitting explanations is identical in the embodiments explained below.

A object searching unit 104A transmits the coordinates information for all of the object images detected as the result for the object search to a display image generating unit 106A. The display image generating unit 106A sets the depth of field so as to focus on all of the objects detected by the object searching unit 104A and develops the LF image. FIG. 17A exemplifies an image focusing on three objects 121, 122, and 123.

Figure 13:
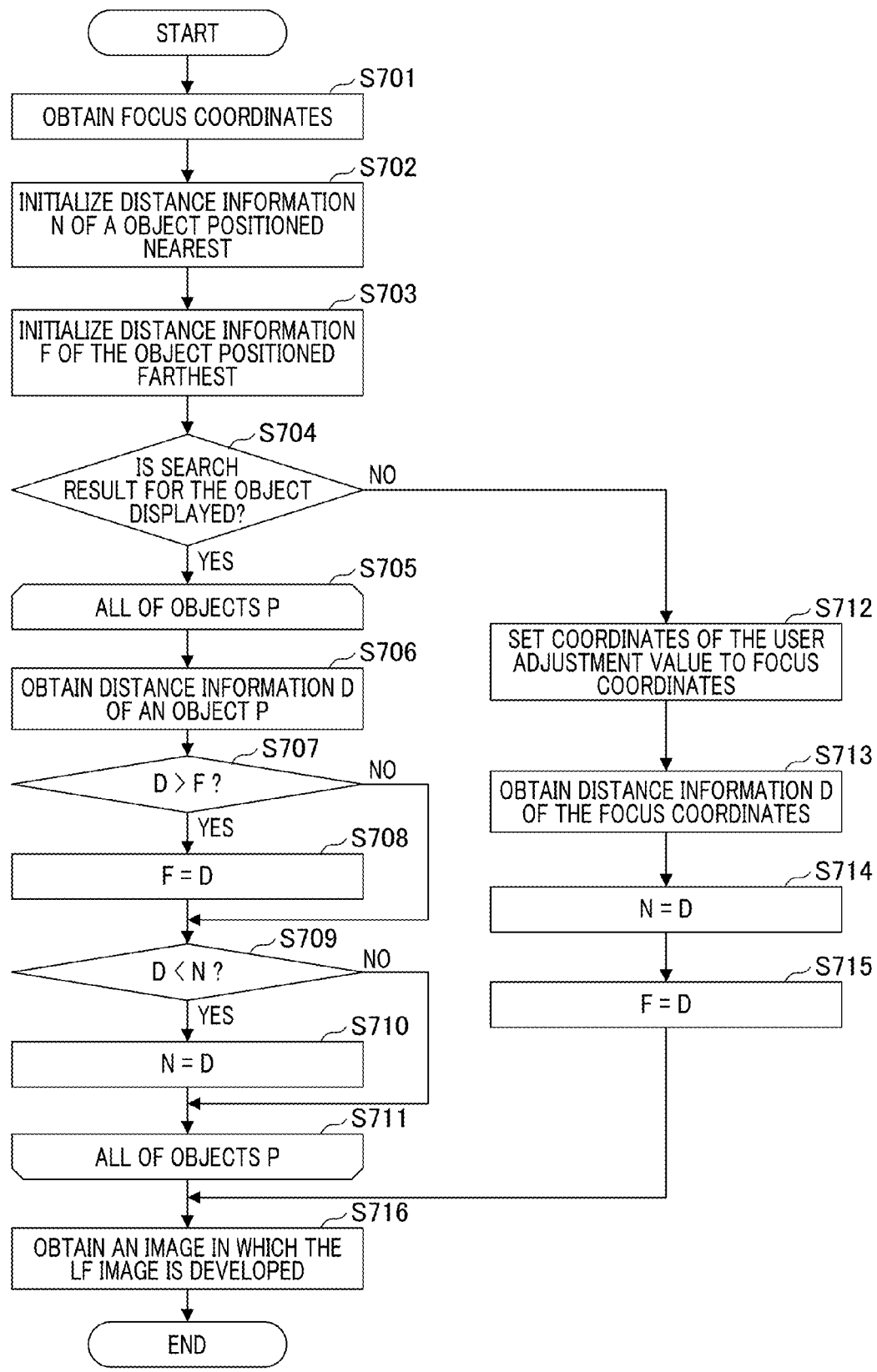
FIG. 13 is a flowchart illustrating an example of a process of the display image generating unit according to a second embodiment of the present invention.

FIG. 13 is a flowchart illustrating an example of a process performed by the display image generating unit 106A. The display image generating unit 106A first obtains the coordinates information to be focused by the user adjustment value receiving unit 108 and the object searching unit 104A (S701). Here, there may be a plurality of coordinates information to be obtained. Next, the distance information to an object positioned nearest (referred to as "N") is initialized at infinity (S702) and the distance information to an object positioned farthest (referred to as "F") is initialized at zero (S703). Next, it is determined whether or not the current display mode is a display mode that is a result of the object search (S704). As the result of the determination, when the current display mode is the display mode as the result of the object search, the process proceeds to S705, and when the current display mode is not the display mode as the result of the object search, the process proceeds to S712.

Processes from S706 to S710, which are between S705 and S711, are executed as iterating processing. The display image generating unit 106A obtains the distance information (referred to as "D") with respect to all of the detected objects P from the depth map generating unit 105 (S706). S707 is a process of comparing the distance information D and F and determining whether or not D is larger than F. When D is larger than F, that is, the object P is positioned farthest among the detected objects, the process proceeds to S708 and the process for updating F by D (process of substituting a value of D for F) is executed. In contrast, when D is F or less, the process proceeds to S709.

S709 is a process of comparing the distance information D and N and determining whether or not D is smaller than N. When D is smaller than N, that is, when the object P is positioned at the nearest position among the detected objects, the process proceeds to S710 and the process of updating N by D (the process of substituting a value of D for N) is executed. After the process of S710, or when D is N or more, the process proceeds to S711 to continue the process with respect to the subsequent object. The processes from S706 to S710 with respect to all of the objects end, and the process proceeds to S716.

When the process proceeds to S712 from S704, the display image generating unit 106A obtains the distance information D corresponding to the focus coordinates from the depth map generating unit 105 after setting the coordinates of the user adjustment value to the focus coordinates (S713). In S714, the distance information N is updated by D (the value D is substituted for N) and the distance information F is updated by D in S715 (the value D is substituted for F). Then, the process proceeds to S716.

In S716, the display image generating unit 106A determines a focus range from each value of F and N. That is, the range to be focused on is a range corresponding to the distance information from the N value to the F value, and the display image generating unit 106A notifies the focus position and the depth of field of the LF image developing unit 103 and requests the development of the LF image. The display image generating unit 106A obtains the developed image, that is, image data focusing on the plurality of detected objects, and transmits it to the image displaying unit 107.

Accordingly, the image displaying unit 107 displays an image focusing on the plurality of objects. According to the present embodiment, the image focusing on all of the detected objects can be displayed when the plurality of the objects are detected as the result for the object search.

Third Embodiment

Next, a description will be given of a third embodiment of the present invention. The second embodiment describes the process of generating the display image assuming that focusing on the plurality of objects detected as the searched result is possible. However, in the LF image, focusing on all of the objects is not always possible depending on the property of the lens used for the shot or the shot contents. Accordingly, in the present embodiment, notification processing is performed when focusing on the objects detected as the result of the object search is not possible. That is, when focusing on the objects detected as the result of the object search is not possible, the display image generating unit 106B generates an image to provide notification regarding same. This image is superimposed on the developed image and one display image is generated.

Figure 14:
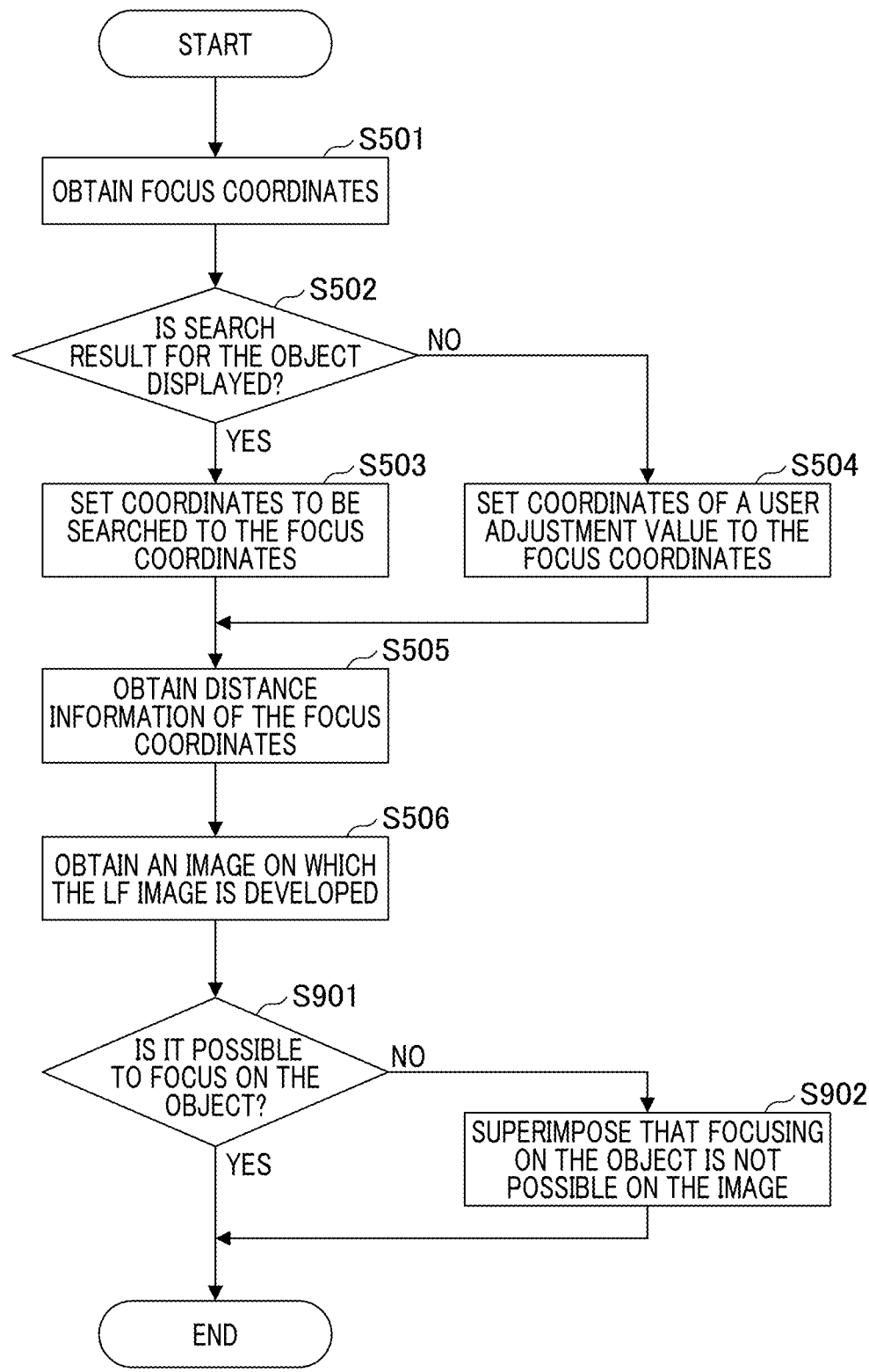
FIG. 14 is a flowchart illustrating an example of a process of the display image generating unit according to a third embodiment of the present invention.

FIG. 14 is a flowchart illustrating an example of a process performed by the display image generating unit 106B. The processes from S501 to S506 are described in FIG. 12 and thus S901 and S902, which are different, will be described below.

Figure 17B:
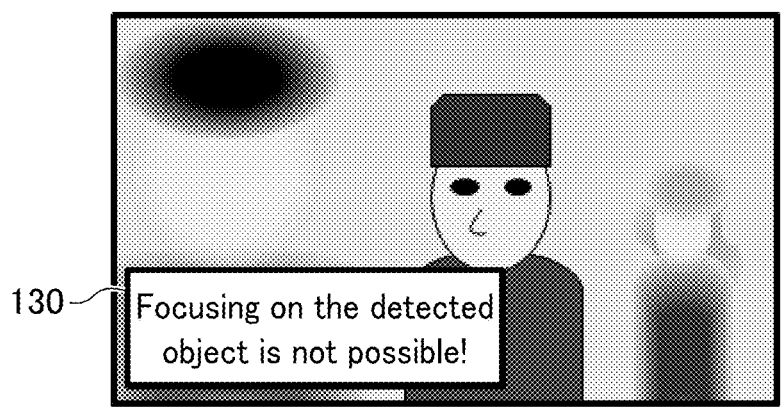

After the process of S506, the display image generating unit 106B determines whether or not focusing on a detected object is possible (S901). When focusing on a detected object is possible, the display processing of the image focusing on the object is performed. Or, when focusing on the detected object is not possible, the process proceeds to S902, and the display image generating unit 106B generates an image that provides notification that focusing on the corresponding object is not possible, and performs the process of superimposing this image on the developed image. FIG. 17B illustrates an example of an image generated in S902. A message that indicates focusing on the detected object is not possible is displayed on the display area 130 in the screen of the image displaying unit 107.

According to the present embodiment, when focusing on the object detected as the result of the object search is not possible, it is possible to notify the user.

Fourth Embodiment

Next, a description will be given of a fourth embodiment of the present invention. In the present embodiment, a pan-focus image is displayed when focusing on the object detected as the result of the object search is not possible. The display image generating unit 106C performs a process of generating the pan-focus image when focusing on the object detected as the result of the object search is not possible.

Figure 15:
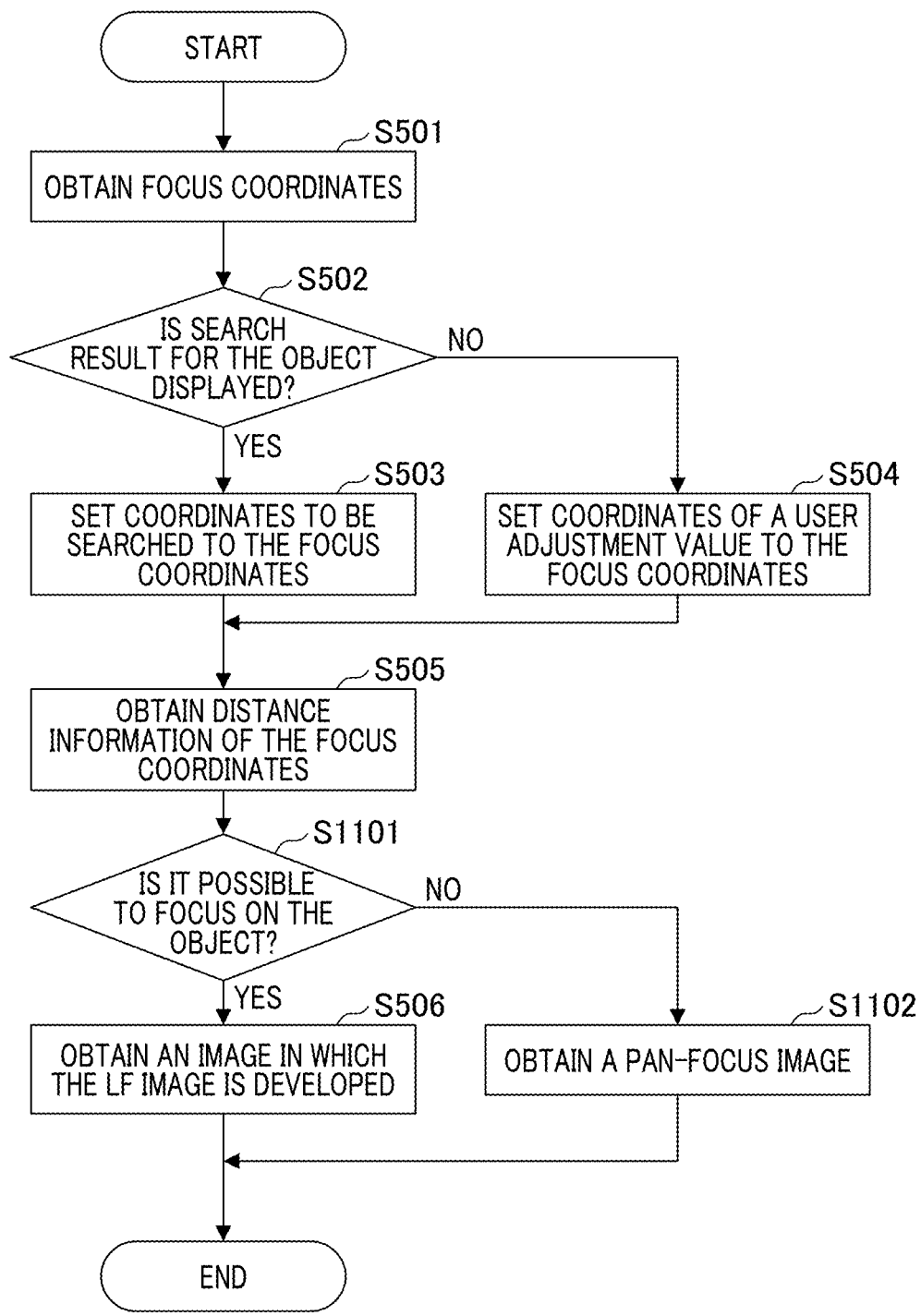
FIG. 15 is a flowchart illustrating an example of a process of the display image generating unit according to a fourth embodiment of the present invention.

FIG. 15 is a flowchart illustrating a process performed by the display image generating unit 106C. The processes from S501 to S506 are as described in FIG. 12 and the processes of S1101 and S1102, which are different, will be described below.

The display image generating unit 106C determines whether or not focusing on the object is possible, that is, whether or not effective distance information can be obtained in S505, after the distance information corresponding to the focus coordinates is obtained in S505 (S1101). When the effective distance information cannot be obtained, the process proceeds to S1102, and when the effective distance information can be obtained, the process proceeds to S506.

In S1102, the display image generating unit 106C requests the development of the pan-focus image of the LF image developing unit 103, obtains the developed pan-focus image, and transmits it to the image displaying unit 107. Hence, the developed pan-focus image is displayed on the screen of the image displaying unit 107 (see FIG. 17A). According to the present embodiment, when focusing on the object detected as the result of the object search is not possible, the pan-focus image having a maximum depth of field can be displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-115773, filed Jun. 4, 2014, which is hereby incorporated by reference wherein in its entirety.

What is claimed is:

1. An image processing device comprising:
   at least one memory that stores a program; and
   at least one processor for executing the program stored in the at least one memory to perform:
   a first image acquiring step of acquiring a plurality of first images having a predetermined depth of field corresponding to pan-focus from a plurality of light-field data, a focus state of each light-field data being changeable;
   a searching step of searching for and detecting, from the plurality of light-field data, light-field data that includes a predetermined object by analyzing each of the plurality of first images acquired in the first image acquiring step; and
   a second image acquiring step of acquiring a second image that has a shallower depth of field than the predetermined depth of field and that is focused on the predetermined object, based on the light-field data detected in the searching step.

2. The image processing device according to claim 1, wherein the at least one processor executes the program stored in the at least one memory to further execute a distance information generating step of generating distance information that indicates a depth in relation to the light-field data, and
   wherein, in the second image acquiring step, the distance information corresponding to the predetermined object, generated in the distance information generating step, is obtained, and the second image focusing on the predetermined object is acquired.

3. The image processing device according to claim 1, wherein the light-field data includes information about light rays and direction information of light rays.

4. The image processing device according to claim 1, wherein, when the light-field data including a plurality of predetermined objects is detected in the searching step, a depth of field is set, in the second image acquiring step, that allows for focusing on a plurality of detected objects.

5. The image processing device according to claim 1, wherein, when focusing on the predetermined object detected in the searching step is not possible, a maximum depth of field is set in the second image acquiring step.

6. The image processing device according to claim 1, further comprising a display screen configured to display the second image acquired in the second image acquiring step,
   wherein, when focusing on the predetermined object detected in the searching step is not possible, a notification image is generated in the second image acquiring step to provide a notification that focusing on the predetermined object is not possible, and a process of displaying the notification image on the display screen is performed.

7. The image processing device according to claim 1, further comprising an imaging unit configured to receive light from an object in an image through an imaging optical system,
   wherein the imaging unit (1) has a plurality of microlenses and a plurality of photoelectric converters that convert light incident respectively from the imaging optical system via the plurality of microlenses into an electric signal, and (2) outputs information about light rays indicating a light intensity in relation to the image and direction information of light rays, and
   wherein each of the plurality of light-field data includes the information about light rays and the direction information of light rays.

8. A control method of an image processing device, the method comprising:
   a first image acquiring step of acquiring a plurality of first images having a predetermined depth of field corresponding to pan-focus from a plurality of light-field data, a focus state of each light-field data being changeable;
   a searching step of searching for and detecting, from the plurality of light-field data, light-field data that includes a predetermined object by analyzing each of the plurality of first images acquired in the first image acquiring step; and
   a second image acquiring step of acquiring a second image that has a shallower depth of field than the predetermined depth of field and that is focused on the predetermined object, based on the light-field data detected in the searching step.

9. The control method of the image processing device according to claim 8, further comprising a distance information generating step of generating distance information indicating a depth in relation to the light-field data,
wherein, in the second image acquiring step, the distance information corresponding to the predetermined object, generated in the distance information generating step, is obtained, and the second image focusing on the predetermined object is acquired.

10. The control method of the image processing device according to claim 9, wherein the light-field data includes information about light rays and direction information of light rays.

11. The control method of the image processing device according to claim 8, wherein, when the light-field data including a plurality of predetermined object is detected in the searching step, a depth of field is set, in the second image acquiring step, that allows focusing on a plurality of detected objects.

12. The control method of the image processing device according to claim 8, wherein, when focusing on the predetermined object detected in the searching step is not possible, a maximum depth of field is set in the second image acquiring step.

13. The control method of the image processing device according to claim 8, further comprising a displaying step of displaying the second image acquired in the second image acquiring step,
wherein when focusing on the predetermined object detected in the searching step is not possible, a notification image is generated in the second image acquiring step to provide a notification that focusing on the predetermined object is not possible, and a process of displaying the notification image in the displaying step is performed.

14. The control method of the image processing device according to claim 8, further comprising an imaging step of capturing an image using an imaging unit that (1) has a plurality of microlenses and a plurality of photoelectric converters that convert light incident respectively from an imaging optical system via the plurality of microlenses into an electric signal, and (2) outputs information about light rays indicating a light intensity in relation to the image and direction information of light rays,
wherein each of the plurality of light-field data includes the information about light rays and the direction information of light rays.

15. A non-transitory computer-readable storage medium that stores a program for causing a computer to execute each step of a control method of an image processing device, the method comprising:
a first image acquiring step of acquiring a plurality of first images having a predetermined depth of field corresponding to pan-focus from a plurality of light-field data, a focus state of each light-field data being changeable;
a searching step of searching for and detecting, from the plurality of light-field data, light-field data that includes a predetermined object by analyzing each of the plurality of first images acquired in the first image acquiring step; and
a second image acquiring step of acquiring a second image that has a shallower depth of field than the predetermined depth of field and that is focused on the predetermined object, based on the light-field data detected in the searching step.

* * * * *